United States Patent Office 3,234,225
Patented Feb. 8, 1966

---

3,234,225
PRODUCTION OF CYANO TRIAZINE DERIVATIVES
Werner Schwarze and Hermann Schulz, Frankfurt am Main, Germany, assignors to Deutsche Gold- und Silber-Scheideanstalt vormals Roessler, Frankfurt am Main, Germany
No Drawing. Filed Apr. 8, 1963, Ser. No. 271,517
Claims priority, application Great Britain, Apr. 12, 1962, 14,178/62
4 Claims. (Cl. 260—249.9)

The present invention relates to an improved process for the production of 2,4-diamino-6-cyano triazines of the formula

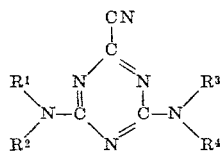

wherein $R^1$, $R^2$, $R^3$ and $R^4$ taken separately are hydrogen, lower alkyl or lower alkenyl groups which, if desired, can be substituted, for example, by chlorine, hydroxy or cyano substituents and each of the pairs of radicals $R^1$ and $R^2$, and $R^3$ and $R^4$ together with the corresponding nitrogen atom represents a 5 or 6 membered heterocyclic ring, such as, for example, a piperidine ring, which may contain a further heteroatom, as, for example, in a morpholine ring.

The 6-cyano substituted 2,4-diamino triazines which can be produced by the process according to the invention are useful as herbicides and particularly for the control of weeds.

In the improved process according to the invention, quaternary ammonium compounds of the following formula are employed as starting materials:

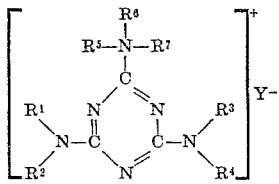

wherein $R^1$, $R^2$, $R^3$ and $R^4$ have the same significance as above. $R^5$, $R^6$ and $R^7$ are the same or different lower alkyl groups and Y is an acid radical. Such quaternary ammonium compounds, for example, can be produced by the process described in Austrian Patent No. 174,377. To convert such starting quaternary ammonium compounds into the corresponding 2,4-diamino-6-cyano triazine it is reacted with an alkali metal or ammonium salt of HCN and preferably with equivalent quantities thereof. Preferably, the reaction is carried out in an inert liquid reaction medium, such as, water or an inert organic solvent. The reaction can be carried out at temperatures between 0° C. and 100° C., preferably, between 60° C. and 90° C.

The following examples will serve to illustrate the process according to the invention.

Example 1

A mixture of 46 g. of potassium cyanide and 120 g. of acetamide was placed in a glass beaker and heated while stirring to 80 to 90° C. At such temperature 52.9 g. of (2,4 - bis - ethylamino-6-trimethylammonium-s-triazinyl)-chloride was added to such mixture portionwise. Trimethylamine was immediately evolved and the reaction was complete in 10 minutes. The reaction mixture was then diluted with dioxane, cooled and poured into water. An almost white powder precipitated out which was filtered off, washed and dried. After recrystallization from chlorobenzene 35.5 g. (91% of the theoretical) of 2,4-bis-ethylamino-6-cyano-1,3,5-triazine of a melting point of 218–219° C. were obtained.

Example 2

43 g. of KCN were dissolved in 200 cc. of water, the mixture heated to 70° C. and 100 g. of [2,4-bis-isopropylamino-6-trimethylammonium-s-triazinyl]-chloride added thereto while stirring. The evolution of trimethylamine was quite stormy and the reaction ended within 5 minutes. After cooling down the reaction product was filtered off, washed and dried. After recrystallization from toluene 75 g. (98.2% of the theoretical) of 2,4-bis-isopropylamino-6-cyano-1,3,5-triazine of a melting point of 168–169° C. were obtained.

Example 3

A mixture of 57.5 g. of KCN and 150 g. of formamide was prepared and heated to 80° C. Then 69.3 g. of [2 - ethylamino-4-isopropylamino-6-trimethylammonium-s-triazinyl]-chloride were added thereto slowly. Trimethylamine was evolved and the reaction was ended in 5 minutes. After the reaction mixture was cooled down it was poured into water and the precipitate filtered off. After drying 49.2 g. (94.4% of the theoretical) of 2-ethylamino-4-isopropylamino-6-cyano-1,3,5-triazine of a melting point of 173–174° C. were obtained.

Example 4

45.6 g. of [2,4-bis-diethylamino-6-trimethylammonium-s-triazinyl]-chloride were slowly added to a solution of 25 g. of sodium cyanide in 200 cc. of a 1:1 mixture of water and dioxane at 70–80° C. An oil separated out immediately. After 10 minutes the reaction mixture was cooled down and diluted with water. The half crystalline oil was taken up in methylene chloride. After driving off the solvent the residue was distilled under high vacuum. 27.6 g. (77.3% of the theoretical) of 2,4-bis-diethylamino-6-cyano-1,3,5-triazine of a boiling point of 120–125° C. at a pressure of 0.01 torr and a melting point of 60.5–62.5° C. were obtained.

We claim:
1. A process for the production of a 6-cyano-2,4-diamino-s-triazine of the formula

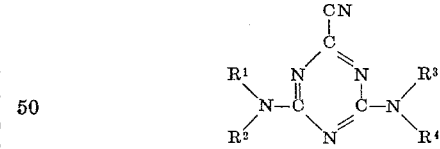

wherein $R^1$, $R^2$, $R^3$ and $R^4$ each severally represents a member selected from the group consisting of hydrogen, lower alkyl, substituted lower alkyl, lower alkenyl and substituted lower alkenyl, the substituents of said substituted lower alkyl and said substituted lower alkenyl being selected from the group consisting of chlorine, —OH and —CN, and each of the pairs of radicals $R^1$ and $R^2$ and $R^3$ and $R^4$ jointly and together with the corresponding nitrogen atom represents a member selected from the group consisting of piperidine and morpholine rings which comprises reacting a quaternary ammonium compound of the formula

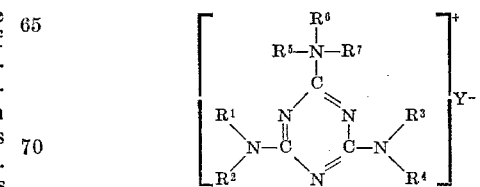

wherein $R^1$, $R^2$, $R^3$ and $R^4$ have the same significance as above, each of $R^5$, $R^6$ and $R^7$ is a lower alkyl radical and Y is an acid radical with a cyanide selected from the group consisting of ammonium cyanide and alkali metal cyanides.

2. The process of claim 1 in which said reaction is carried out in an inert liquid medium.

3. The process of claim 2 in which each of $R^1$ and $R^3$ is hydrogen and each of $R^2$ and $R^4$ is lower alkyl.

4. The process of claim 2 in which each of $R^1$, $R^2$, $R^3$ and $R^4$ is lower alkyl.

References Cited by the Examiner

FOREIGN PATENTS 174,377    3/1963    Austria.

OTHER REFERENCES

Hellmann et al.: "Chemische Berichte," vol. 88 (1955), pp. 1944–1951.

Snyder et al.: J.A.C.S., vol. 70 (1948), pages 1703–1705 and 1857–1860.

WALTER A. MODANCE, *Primary Examiner.*
NICHOLAS S. RIZZO, *Examiner.*